(12) United States Patent
Arroyo et al.

(10) Patent No.: US 9,348,759 B2
(45) Date of Patent: May 24, 2016

(54) DIRECT MEMORY ACCESS (DMA) ADDRESS TRANSLATION WITH A CONSECUTIVE COUNT FIELD

(71) Applicant: International Business Machines Corporation, Armonk, NY (US)

(72) Inventors: Jesse P. Arroyo, Rochester, MN (US); Gregory M. Nordstrom, Pine Island, MN (US); Srinivas Kotta, Hyderabad (IN); Eric N. Lais, Tillson, NY (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 14/013,354

(22) Filed: Aug. 29, 2013

(65) Prior Publication Data

US 2015/0067224 A1    Mar. 5, 2015

(51) Int. Cl.
*G06F 12/10* (2006.01)
*G06F 13/28* (2006.01)

(52) U.S. Cl.
CPC .......... *G06F 12/1009* (2013.01); *G06F 12/109* (2013.01); *G06F 12/1081* (2013.01); *G06F 13/28* (2013.01); *G06F 2212/1016* (2013.01); *G06F 2212/657* (2013.01)

(58) Field of Classification Search
CPC ............................. G06F 12/1009; G06F 13/28
See application file for complete search history.

(56) References Cited

U.S. PATENT DOCUMENTS

| | | | |
|---|---|---|---|
| 2006/0044934 A1* | 3/2006 | Wong ................. | G06F 12/0246 365/239 |
| 2010/0332730 A1* | 12/2010 | Royer, Jr. ............ | G06F 12/0246 711/103 |

* cited by examiner

*Primary Examiner* — Idriss N Alrobaye
*Assistant Examiner* — Ronald Modo
(74) *Attorney, Agent, or Firm* — Martin & Associates, LLC; Derek P. Martin

(57) ABSTRACT

DMA translation table entries include a consecutive count (CC) field that indicates how many subsequent translation table entries point to successive real page numbers. A DMA address translation mechanism stores a value in the CC field when a translation table entry is stored, and updates the CC field in other affected translation table entries as well. When a translation table entry is read, and the CC field is non-zero, the DMA controller can use multiple RPNs from the access to the single translation table entry. Thus, if a translation table entry has a value of 2 in the CC field, the DMA address translation mechanism knows it can access the real page number (RPN) corresponding to the translation table entry, and also knows it can access the two subsequent RPNs without the need of reading the next two subsequent translation table entries.

9 Claims, 10 Drawing Sheets

| DMA IOPN | RPN | CC | Other Fields |
|---|---|---|---|
| IOPN1 | RPN1 | 3 | |

DIRECT MEMORY ACCESS (DMA) ADDRESS TRANSLATION WITH A CONSECUTIVE COUNT FIELD

BACKGROUND

1. Technical Field

This disclosure generally relates to computer systems, and more specifically relates to direct memory access (DMA) in computer systems.

2. Background Art

Computer systems typically use direct memory access (DMA) to move data between I/O devices and memory. Because the data may be moved without the processor moving the data, this frees up the processor for other tasks. DMA thus boosts system performance.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The IBM POWER Based Server computer system developed by IBM is an example of a computer system that supports logical partitioning. If logical partitioning on a IBM POWER Based Server computer system is desired, partition manager code (referred to as a "hypervisor" in IBM terminology) is installed that allows defining different computing environments (known as logical partitions) on the same platform. Once the partition manager is installed, logical partitions may be created that define different computing environments. The partition manager manages the logical partitions to assure that they can share needed resources in the computer system while maintaining the separate computing environments defined by the logical partitions.

In a logically partitioned computer system, I/O adapters may be virtualized to support the I/O operations needed in the various logical partitions. An address translation table is created to enable the hardware I/O adapter to perform DMA I/O operations to the memory of individual logical partitions. A DMA window is a defined region of I/O address space that correlates through address translation tables to regions of host system memory. The DMA window is what an I/O adapter and its corresponding device driver see as a continuous region of I/O address space that it can read from and write to during DMA operations.

Known methods of DMA address translation can result in inefficient DMA accesses. For example, when a system has a page size of 4K, but 256 MB need to be moved in a DMA transfer, this requires 64K accesses to an address translation table to perform the transfer.

BRIEF SUMMARY

DMA translation table entries include a consecutive count (CC) field that indicates how many subsequent translation table entries point to successive real page numbers. A DMA address translation mechanism stores a value in the CC field when a translation table entry is stored, and updates the CC field in other affected translation table entries as well. When a translation table entry is read, and the CC field is non-zero, the DMA controller can use multiple RPNs from the access to the single translation table entry. Thus, if a translation table entry has a value of 2 in the CC field, the DMA address translation mechanism knows it can access the real page number (RPN) corresponding to the translation table entry, and also knows it can access the two subsequent RPNs without the need of reading the next two subsequent translation table entries. This reduces the number of accesses for translation table entries, which improves system performance.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide DMA translation table entries that include a consecutive count (CC) field that indicates how many subsequent translation table entries point to successive real page numbers. A DMA address translation mechanism stores a value in the CC field when a translation table entry is stored, and updates the CC field in other affected translation table entries as well. When a translation table entry is read, and the CC field is non-zero, the DMA controller can use multiple RPNs from the access to the single translation table entry. Thus, if a translation table entry has a value of 2 in the CC field, the DMA address translation mechanism knows it can access the real page number (RPN) corresponding to the translation table entry, and also knows it can access the two subsequent RPNs without the need of reading the next two subsequent translation table entries.

Figure 1:
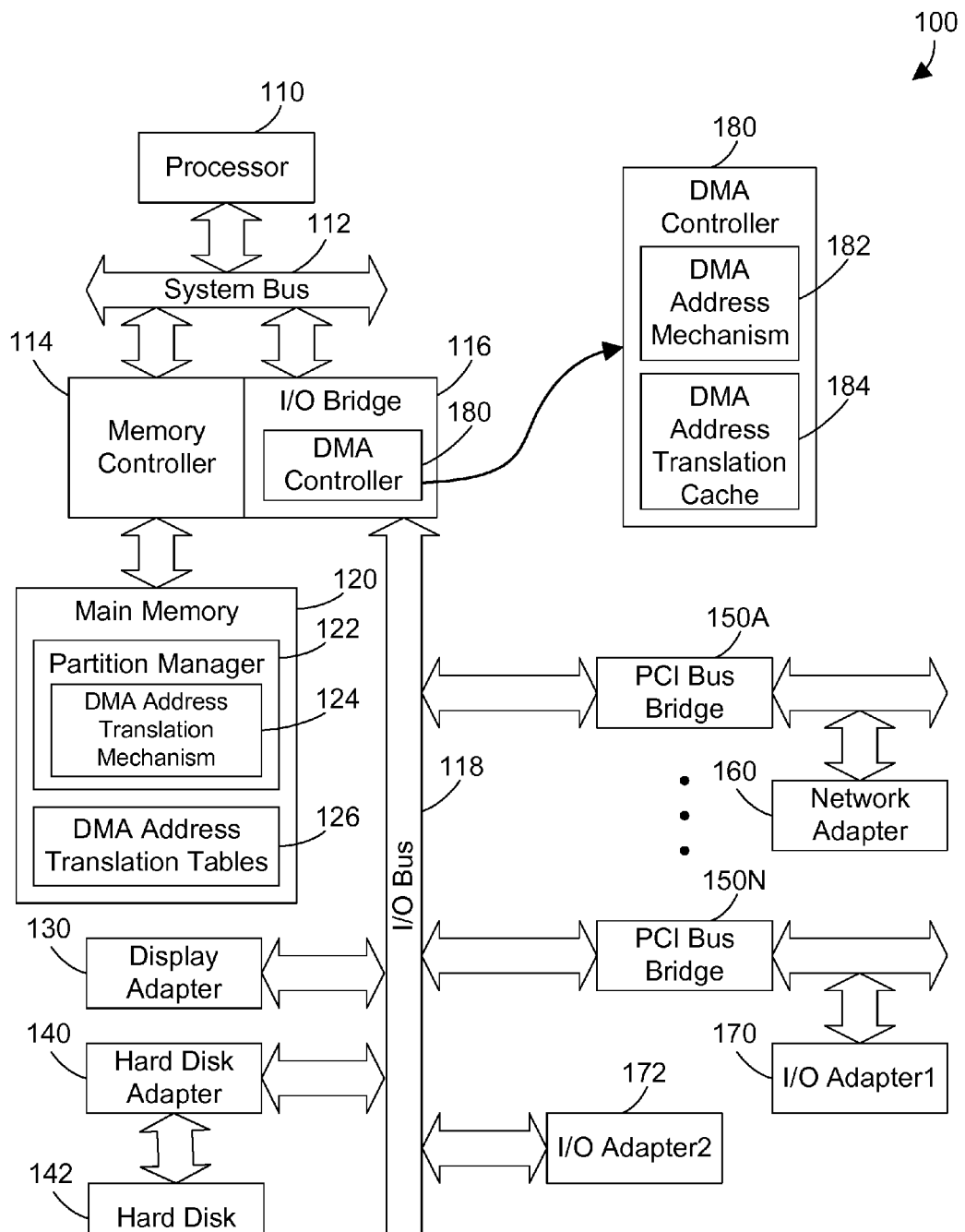
FIG. 1 is a block diagram of a computer system that includes a DMA address translation mechanism and corresponding translation tables.

Referring to FIG. 1, a computer system 100 is one suitable implementation of a server computer system that includes a partition manager that includes a dynamic DMA window mechanism. Server computer system 100 is an IBM POWER Based Server computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110 coupled to a system bus 112, which in turn is coupled to a memory controller 114, and an I/O bridge 116 The memory controller 114 controls accesses to main memory 120, which contains a partition manager 122 that includes a DMA address translation mechanism 124. Partition manager 122 is a sophisticated program that contains low-level code to manage the resources of computer system 100. The DMA address translation mechanism 124 creates and manages DMA address translation tables 126. DMA address translation tables 126 enable a hardware I/O adapter to perform DMA I/O operations to the memory of the computer system 100, or individual logical partitions within it, by defining a DMA window that is a defined region of I/O bus 118 address space that correlates through the address translation tables 126 to regions of main memory 120. While the particular implementation shown in FIG. 1 uses a partition manager 122, other firmware could host the functions of the DMA address translation mechanism 124, such as a hypervisor in a logically portioned computer, or a hardware abstraction program such as POWER Run Time Abstraction Services (RTAS) or Intel x86 BIOS, that has detailed knowledge of the hardware structure and operations. The discuss herein uses the term "firmware" to mean any system software that creates and manages DMA translation tables and DMA translation hardware for a computing system.

The I/O bridge 116 is coupled to an I/O bus 118, which is coupled to a display adapter 130, a hard disk adapter 140, multiple secondary I/O bus bridges, shown in FIG. 1 as 150A, . . . , 150N. I/O bridge 116 includes a DMA controller 180, details of which are shown in the upper right portion of FIG. 1. The I/O bridge 116 may be a PCI host bridge or PCI root complex and the I/O bus 118 then may be accordingly a PCI I/O bus, and the I/O bus bridges 150A . . . 150N may then be accordingly PCI bridge types.

For the sake of illustration, PCI bus bridge 150A includes a connection to a network adapter 160, and PCI bus bridge 150N includes a connection to an I/O adapter 170, which could represent a PCI and PCI X configuration. An I/O adapter 172 is also shown coupled directly to the I/O bus 118, which could represent either a PCI and PCI-X configuration, or as connected singularly to the I/O bridge may represent a PCI-Express configuration. One skilled in the art will recognize that configurations coupling PCI-Express switches between the I/O bridge and one or more I/O adapters are also suitable PCI-Express configurations. The I/O adapter 170 can be any suitable I/O adapter, including known I/O adapters and I/O adapters developed in the future. The hard disk adapter 140 is connected to a hard disk 142.

The DMA controller 180 allows transferring data directly between I/O devices, such as hard disk adapter 140 or I/O adapter 170, and main memory 120, without processor 110 making the transfers. DMA controllers are well-known in the art. The DMA controller 180 includes many prior art functions, but additionally includes a DMA address mechanism 182 that performs functions not known in the art, as discussed in more detail below. DMA controller 180 additionally includes a DMA address translation cache 184, as discussed in more detail below. While the DMA controller 180 is shown in FIG. 1 to be within the I/O bridge 116, the DMA controller 180 could also be a separate component attached between the I/O bridge 116 and the system bus 112. One skilled in the art will realize the DMA controller 180 could be implemented in a variety of different ways and locations, all of which are within the scope of the claims and disclosure herein.

Computer system 100 utilizes well known virtual addressing mechanisms that allow the programs of computer system 100 to behave as if they only have access to a large, contiguous address space instead of access to multiple, smaller storage entities such as main memory 120 and local hard disk 140. Therefore, while partition manager 122 and DMA address translation tables 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes program instructions that make up the partition manager 122, which then manages the initialization of logical partitions on computer system 100.

Although computer system 100 is shown to contain only a single processor and a single system bus, those skilled in the art will appreciate that a DMA address translation mechanism may be practiced using a computer system that has multiple processors and/or multiple system buses. In addition, the interfaces that are used preferably each include separate, fully programmed microprocessors that are used to off-load compute-intensive processing from processor 110. However, those skilled in the art will appreciate that these functions may be performed using I/O adapters as well, such as I/O adapter 170.

Display adapter 130 is used to directly connect one or more displays to computer system 100. These displays, which may be non-intelligent (i.e., dumb) terminals or fully programmable workstations, are used to provide system administrators and users the ability to communicate with computer system 100. Note, however, that while display adapter 130 is provided to support communication with one or more displays, computer system 100 does not necessarily require a display, because all needed interaction with users and other processes may occur via network adapter 160.

Network adapter 160 is used to connect computer system 100 to other computer systems or workstations via a network. Network adapter 160 broadly represents any suitable way to interconnect electronic devices, regardless of whether the network comprises present-day analog and/or digital techniques or via some networking mechanism of the future. Network adapter 160 preferably includes a combination of hardware and software that allow communicating on the network. Software in the network adapter 160 preferably includes a communication manager that manages communication with other computer systems via the network using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network adapter 160. The I/O adapter 170 represents any suitable I/O adapter that could be used in computer system 100.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
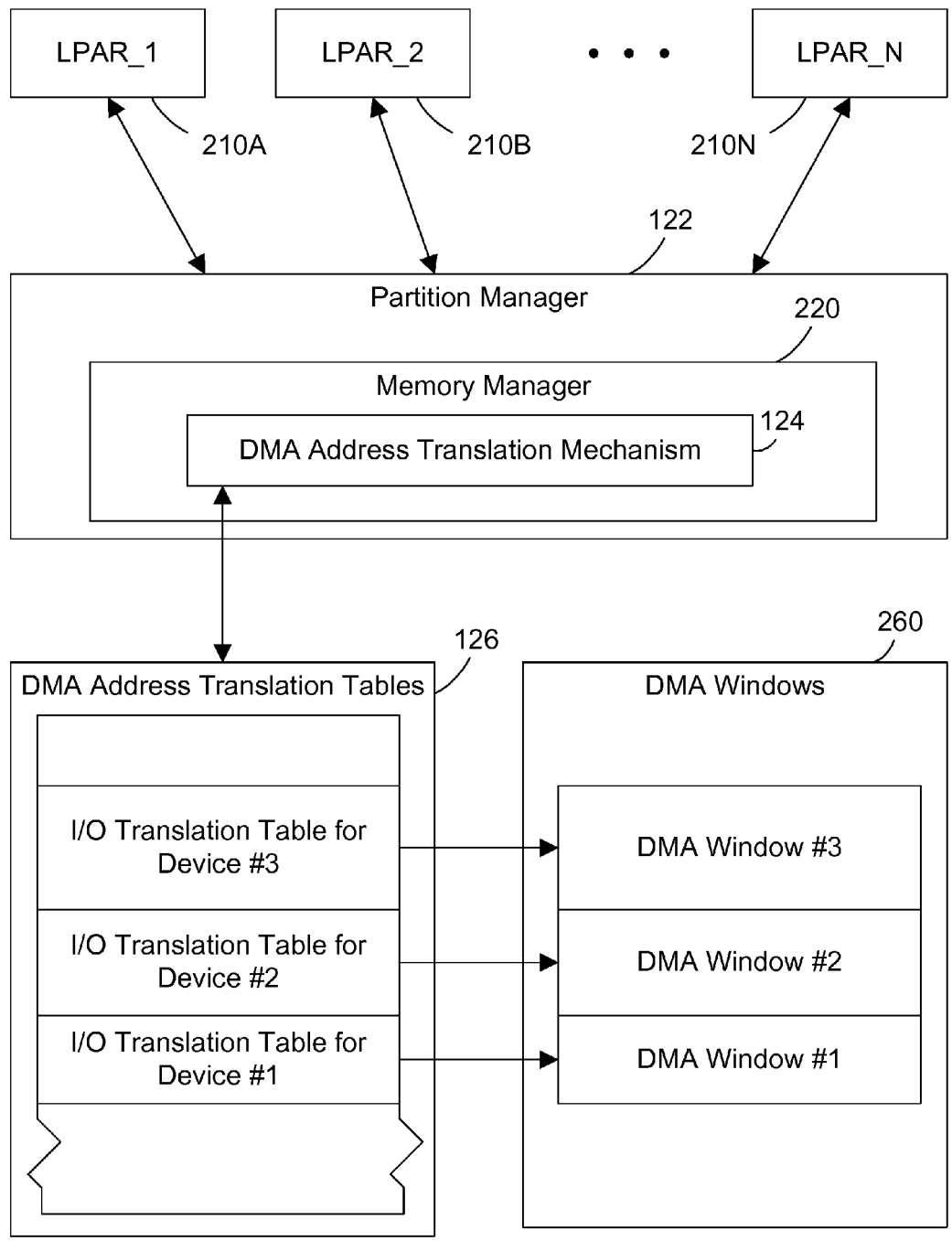
FIG. 2 is a block diagram showing logical partitions within the computer system of FIG. 1, having a partition manager and a memory manager as an agent within or adjunct to the partition manager, and the relationship of the partition manager to DMA address translation tables and DMA windows.

FIG. 2 shows a logical view of some of the features of computer system 100 in FIG. 1 employing logical partitions. Multiple logical partitions are defined, and are shown in FIG. 2 as LPAR_1 210A, LPAR_2 210B, . . . , LPAR_N 210N. A logical partition typically specifies a portion of memory, along with an assignment of processor capacity and other system resources. Thus, one logical partition could be defined to include two processors, a portion of memory 120, and a network adapter. Another logical partition could be defined to include three other processors, a different portion of memory 120, and an I/O adapter. The partition manager 122 enforces the logical separation between logical partitions so each logical partitions appears from a logical point of view to be a separate computer system. The DMA address translation mechanism 124 shown in FIG. 1 could be implemented in a memory manager 220 shown in FIG. 2 that is embedded within, or under the control of, the partition manager 122.

The logical partitions 210A, 210B, . . . , 210N are created and maintained by the partition manager 122. As shown in FIG. 1, the partition manager 122 includes a DMA address translation mechanism 124, which creates DMA address translation tables 126 that provide address translation (pointers) to corresponding DMA windows 260. Thus, an I/O translation table for device #3 points to a corresponding DMA window #3, as shown in FIG. 2. An I/O translation table for device #2 points to a corresponding DMA window #2. An I/O translation table for device #1 points to a corresponding DMA window #1.

Figure 3:
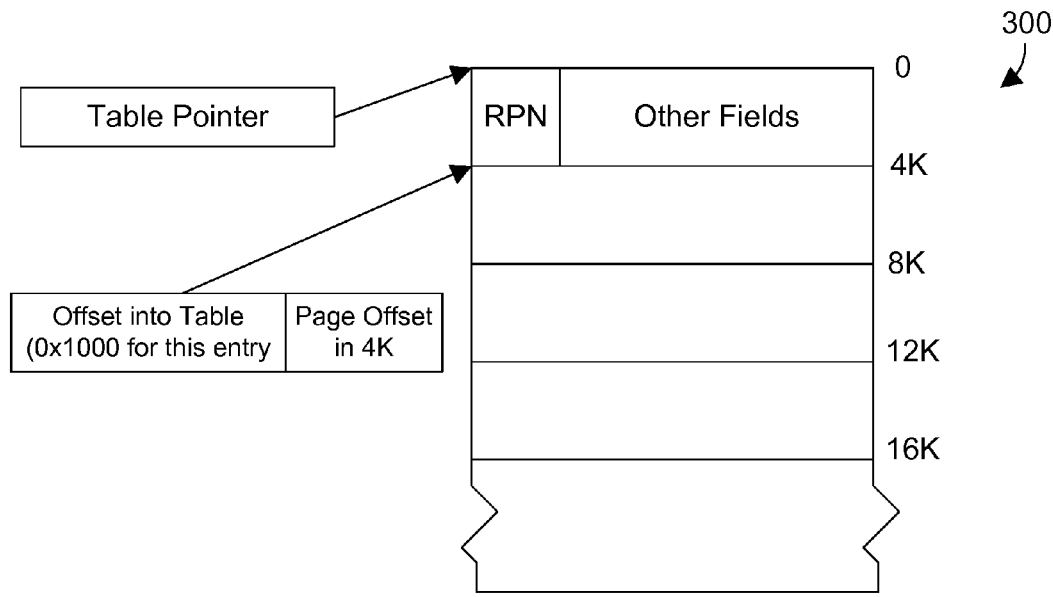
FIG. 3 shows a prior art DMA address translation table.

Referring to FIG. 3, a prior art translation table 300 is shown, which includes many pages of 4K each. Each 4K page includes a real page number (RPN), and there may be other fields as well, including access permissions that determine whether a DMA can read or write that RPN. The RPN is a pointer to the real page number in memory 120 shown in FIG. 1. A DMA controller could request data transfer starting at address 0x1000 (4K) in the IO bus address domain and transferring 12 KB of data. The DMA operation involves the DMA address mechanism 182 finding the entry in the translation table 300 corresponding to an IO Page Number (IOPN) value of 1 for a 4 KB page size and retrieving 3 successive entries, one for each successive IOPN of the overall 12 KB DMA request.

When the size of the DMA request is very large, such as several megabytes, the DMA address mechanism 182 must retrieve a very large number of successive entries from the translation table 300 to complete that DMA request. As the DMA address mechanism 182 is unlikely to have facilities to store more than a few translation table entries at any one time, large DMA transfers, such as more than 64 KB in common practice, to even successive IOPNs through that transfer will require that the DMA address mechanism 182 periodically fetch additional entries from the translation table 300.

In such cases, hardware can optimize performance by overlapping fetches of translation table entries (TTEs) from memory with DMA data transfer to or from memory. However this complicates the hardware design by adding logic to manage interleaving TTE fetches with DMA data transfer and buffers in the hardware logic to hold prefetched translations. The advantages of this are reduced or eliminated in any cases in which the DMA address mechanism 182 receives or permits multiple sources of DMA requests concurrently, such that TTE prefetch resources are either in contention between these DMA requests, or must be reused by a new request prior to completing a current request. The latter is especially likely with large DMA transfers for which TTE prefetch is intended to optimize performance, as hardware must commonly multiplex partial DMA transfers for each request so that no one request delays transfers for other requests for an unduly long period. As multiple simultaneous DMA requests is common practice in the industry, to maximize overall IO bus throughput, TTE prefetch tends to be of limited value in most practical computing systems.

Additionally, hardware can optimize performance by prefetching successive TTEs when fetching any one TTE. This anticipates that successive DMAs reference successive 4K addresses on the IO bus, and improves performance in the event that the DMA references are indeed to successive 4K addresses. However, this increases the number of translations that the hardware must then cache, which is counter to efficient use of limited cache resources in general, and may result in reduced performance if subsequent DMAs are not to successive addresses. This also is only of marginal value as the size of the cache may limit the number of successive TTEs pre-fetched to only one or a very small number. It is common in the art for these reasons that such pre-fetch methods are limited to caching only one or two additional successive TTEs, and are a correspondingly limited performance optimization.

It is an aspect of logically partitioned computers that memory is provided to guest operating systems, or logical partitions running an individual operating system, in Logical Memory Blocks (LMBs) composed of many memory pages that are contiguous in both the logical and real addresses of the system. It is another aspect of computer operating systems that DMA buffers used with IO devices are commonly allocated as block of multiple pages of contiguous virtual or real memory. In some computing systems, if the DMA translation table is sufficiently large, the entire memory of the operating system image may be mapped at once.

In a DMA translation table indexed by DMA IOPNs, it is therefore possible or likely that for some groups of successive IOPNs, the corresponding RPNs are also successive in value, and that the number of successive IOPNs composing a group of successive RPNs may then be very large. For example, on POWER systems an LMB is commonly 256 MB so that the number of successive 4 KB pages that may form a group of successive IOPNs and corresponding RPNs for DMA may be 64K.

It is also an aspect of computer systems utilizing DMA translation tables that the time for the DMA address mechanism 182 to retrieve a TTE to determine a system memory address is additive to the overall time, or latency, to complete a DMA transfer to or from memory. For very high speed IO buses and devices common in modern systems, the latency to fetch a TTE can be as much as that of a DMA data transfer itself, especially for small data transfers. Thus, TTE fetch latency can contribute as much as 50% to overall DMA transaction time and greatly limit IO bus throughput.

It is therefore desirable to reduce or avoid fetching TTEs as part of DMA operations on an IO bus to as great a degree as possible. This can be achieved by retaining previously used address translation entries in a cache in the DMA controller, if there is a likelihood that a subsequent DMA operation will reference that same TTE and that entry is unchanged, meaning the RPN is the same, as in its prior use. In many environments DMA references may be to the same IOPNs or successive RPNs within a small range, and small caches consistent with the limitations of hardware design may improve overall IO performance by reducing the number of TTE fetches required for DMA operations over longer periods of operation. However, as such hardware caches are necessarily very small in practical implementations, and as is known in the present art to cache individual translations from one IOPN to one RPN for each TTE in the hardware cache, known caches for TTEs offer only limited improvements in DMA translation performance that are highly sensitive to the size of the IO bus address region that is mapped to RPNs and the degree to which addresses in subsequent DMA operations repeatedly address the same IOPNs.

Figure 4:
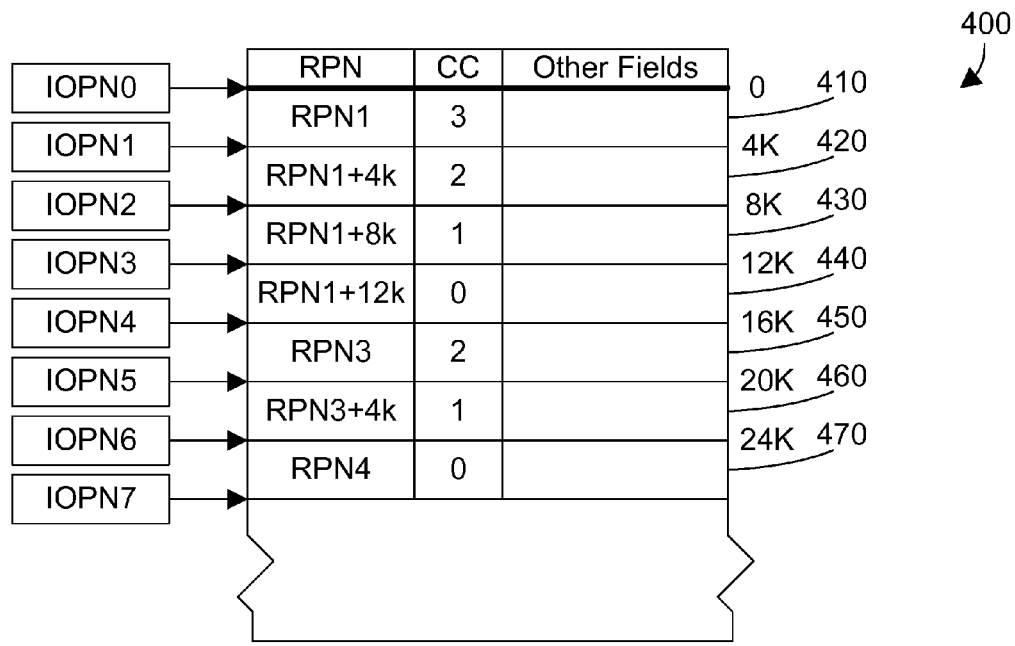
FIG. 4 shows a DMA address translation table that includes a consecutive count (CC) field.

Referring to FIG. 4, a new DMA translation table 400 is one specific implementation for the DMA translation tables 126 shown in FIGS. 1 and 2. DMA translation table 400 includes a Consecutive Count (CC) field that is not present in the prior art translation table 300 shown in FIG. 3. The first entry 410 in the DMA translation table 400 corresponds to IOPN0, points to RPN1 and has a CC value of 3, because the following three entries, corresponding to successive IOPNs, also have successive RPN values. Using the CC field, a DMA that targets IOPN 0 in the DMA translation table 400, which corresponds to DMA address 0x0000 on the IO bus, and spans 12 KB, the DMA address mechanism 182, after fetching the TTE 410 at IOPN0 in the translation table 400, determines that the next 2 successive DMA IOPNs also have successive RPNs. Provided that the successive RPNs also have the same DMA reference permissions—read, write, or both—as may be recorded in the Other Fields of the TTE, the DMA address mechanism 182 then need not access the TTEs 420 and 430 for each of the next 2 DMA pages, as these can be computed by simply incrementing the translation RPN from entry 0 for each successive 4 KB of DMA data.

Alternatively, if the initial DMA address is 4K on the IO bus, for a length of 8 KB, that DMA IOPN1 references entry 420 in the translation table as the starting address. The CC field of entry 420 corresponding to IOPN1 has a value of two, which means the DMA address mechanism then need not fetch the second 4 KB of DMA data, as the CC value of 2 in entry 420 indicates that the real system address for that next IOPN is the RPN of the translation at entry 420 incremented by 4 KB.

Figures 7, 8:
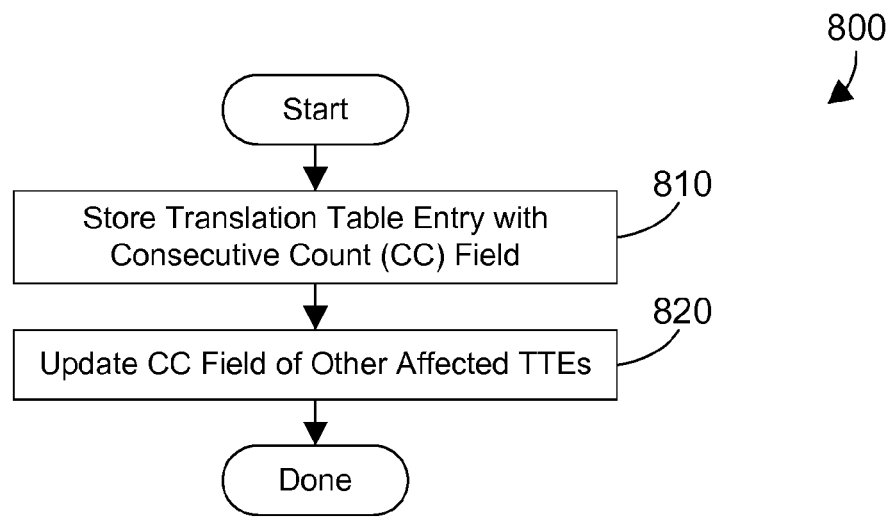
FIG. 7 shows a sample entry in a DMA translation table cache.
FIG. 8 is a flow diagram of a method for using the CC field in translation table entries.

The DMA address translation cache 184 includes the CC field for its entries. A sample entry in the DMA address translation cache 184 is shown in FIG. 7 to include a DMA IOPN field, a RPN field, a CC field, and other fields. Including the CC field in the cache entries further improves utilization of the cache because one entry in the cache can result in multiple access to RPNs without needing multiple accesses to the DMA address translation cache or to the DMA address translation table. The size, in bits or bytes, of the CC field may be chosen to optimize between hardware cache width per entry and the number of consecutive entries that achieve desired performance by eliminating additional fetches for TTEs with consecutive RPNs. The latter is typically a heuristic prediction based on overall system design. For typical IO conditions, there is likely a point in which the number of consecutive RPNs mapped to any one entry is less likely, or a lower bound value of CC that sufficiently increases the likelihood of additional fetches and translation cache hits as to not require the ability to count higher. That is, at some point, an additional bit of CC value in the entry, or in the DMA address translation cache no longer improves overall translation performance.

Referring to FIG. 8, a method 800 for using the CC field on conjunction with TTEs is shown. A TTE with its CC field is stored (step 810). The CC field of other affected TTEs is also updated (step 820). A TTE is affected in this context if addition of the entry in step 810 causes a need to update its CC field, which is performed in step 820. Thus, when adding a new TTE, the DMA address translation mechanism 124 writes the appropriate value to the CC field of the entry and also makes all needed adjustments to the CC fields of other entries as well. If the RPN of the new TTE is the next successive (contiguous) page of memory to the RPN of the entry preceding it, the CC field of all preceding TTEs that are successors to each other and the newly added entry are incremented by one. Referring to FIG. 4, assume that initially the entry at DMA address 12 KB (IOPN 3) is not mapped and a new RPN translation is added for this IOPN. Consider then that this IOPN is mapped to a memory page that is an immediate successor to the RPN of the translation for IOPN2. As the system firmware enters the translation at IOPN3 the firmware inspects the RPN of the previous TTE and determines that these are successive RPNs. The firmware then recalculates the CC values of all entries prior to entry 3, to increment them by one to account for the additional successor RPN in IOPN3.

Figure 5:
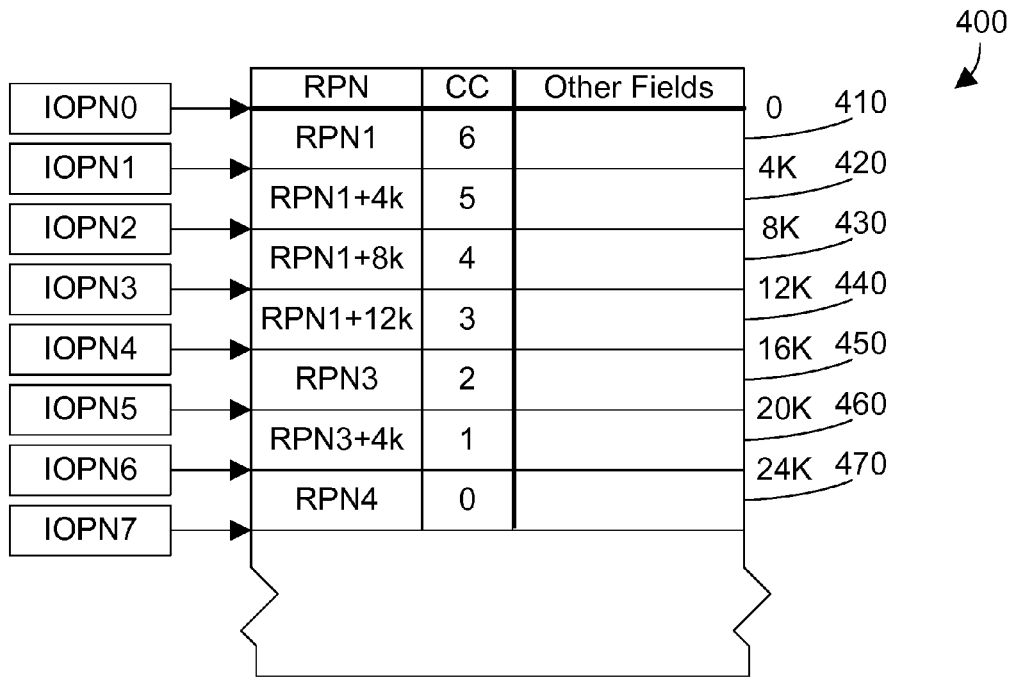
FIG. 5 shows an address translation table with CC fields that are modified with the addition of a new translation table entry.

If the RPN of the next TTE following the modified TTE is immediately successive to the RPN of the modified TTE, the CC field of the modified TTE is set to 1 plus the value of the CC field of that next TTE. If the modified TTE RPN is a successor to the RPN of the immediately preceding TTE and precedes the RPN of the TTE immediately following it, the CC field of the preceding and succeeding TTEs all must be changed taking into account that the newly modified TTE fills a one page (RPN) gap between two TTEs, or sets of TTEs, that were discontiguous within the translation table prior to modifying this TTE. FIG. 5 illustrates the translation table 400 of FIG. 4 following a modification of the entry 440 for IOPN 3 (12 KB) to add a translation from IOPN3 to an RPN that is contiguous to the RPNs of both IOPN2 and IOPN4.

Figure 6:
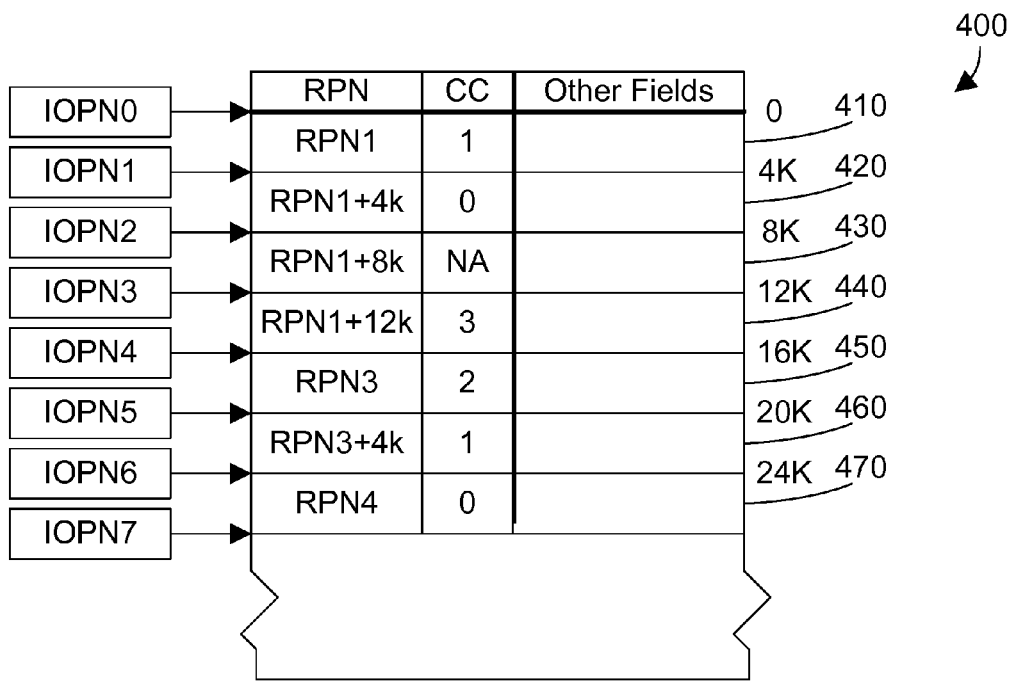
FIG. 6 shows the address translation table in FIG. 5 after a translation table entry is unmapped.

A translation may be removed (or, "invalidated") within a translation table when a memory page is no longer mapped for DMA, or mapped via that particular IOPN. The firmware sets CC fields of any TTEs that previously had RPNs that preceded or succeeded the RPN of the modified TTE. If the unmapped TTE RPN is contiguous to the RPN of the immediately preceding TTE, the CC field of all preceding TTEs that were predecessors to this RPN are decremented by one. Referring to FIG. 6, if the TTE corresponding to DMA address 8 KB (IOPN2) in FIG. 5 is unmapped, then the CC fields of the TTEs at IOPN 0 and IOPN1 are changed to the values of 1 and 0, respectively. If the unmapped TTE RPN is contiguous to the RPN of the immediately following TTE, no changes are required to the succeeding TTEs as the CC field of all the succeeding TTEs remains valid. If the unmapped TTE RPN is contiguous to the RPN of the immediately preceding TTE and also contiguous to the RPN of the immediately succeeding TTE, the CC field of all related preceding TTEs must be decremented by one plus the value of the unmapped CC. Thus, when the TTE at IOPN2, is unmapped, the resulting translation table 400 is shown in FIG. 6.

The foregoing illustrates cases in which IOPNs are mapped or unmapped individually. This could be extended to cases in which a plurality of IOPNs are mapped or unmapped as a group including optimizations possible to compute CC values over this group prior to inserting the RPNs and CC values for those IOPNs into their respective TTEs and making updates to other TTEs that are related as successive or preceding IOPNs and RPNs.

Figure 9:
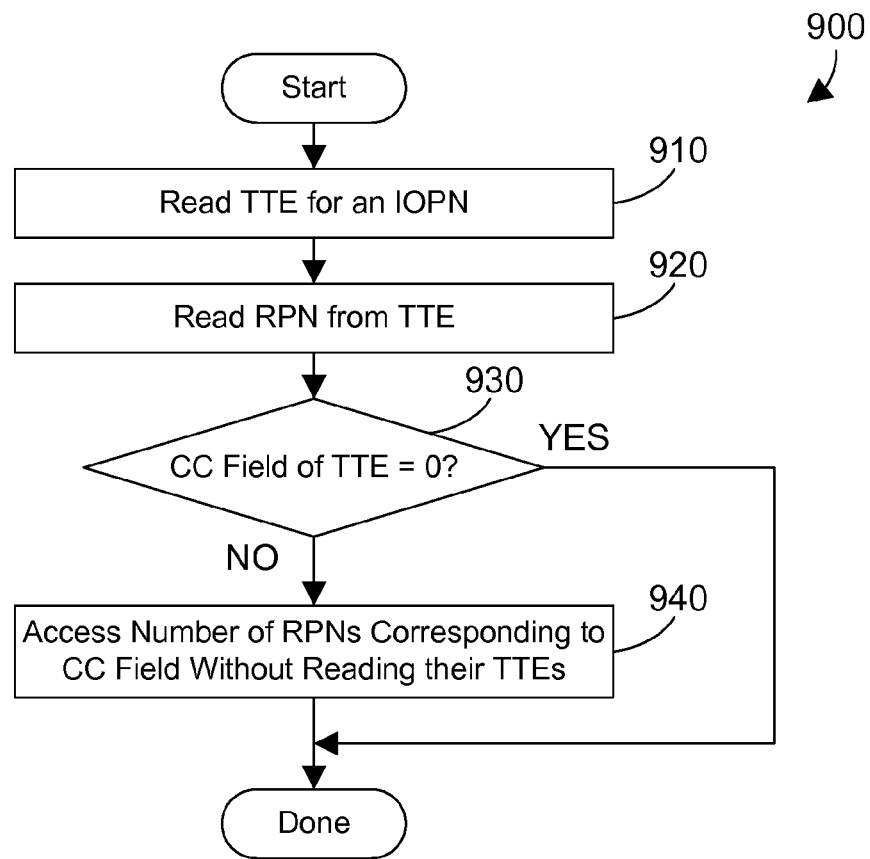
FIG. 9 is a flow diagram of a method for accessing multiple real page numbers (RPNs) when a translation table entry has a non-zero CC field.

Referring to FIG. 9, a method 900 shows advantages of using the CC field. A TTE for an IOPN is read (step 910). The RPN is read from the TTE (step 920). When the CC field of the TTE is zero (step 930=YES), method 900 is done. But when the CC field of the TTE is non-zero (step 930=NO), method 900 may access a number of RPNs corresponding to the CC field without reading their corresponding TTEs. Thus, when a DMA transfer spans four TTEs, and the first TTE read in step 910 has a CC value of 3, this means the DMA controller can read the RPN from the TTE in step 920, then can compute the three subsequent RPNs for the DMA transfer without accessing their corresponding TTEs (step 940). This reduction in TTE fetches results in improved DMA performance.

Figure 10:
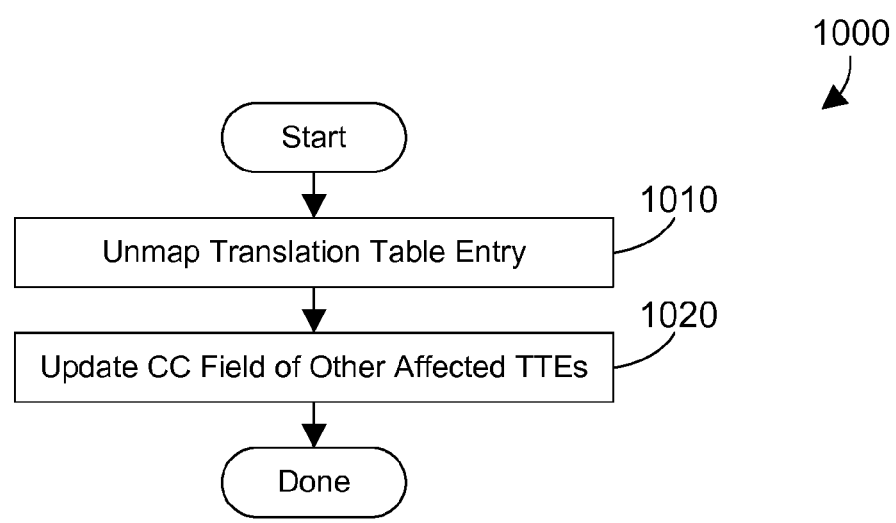
FIG. 10 is a flow diagram of a method for updating the CC fields in a translation table when an entry is unmapped.

FIG. 10 shows a method 1000 for when a TTE is unmapped. The TTE is unmapped (step 1010). The CC field of other affected TTEs is updated (step 1020). A TTE is affected in this context when it's CC field needs to be updated as a result of unmapping the TTE in step 1010.

While any suitable value could be used in the CC field, it may be desirable to limit the number of successive RPNs indicated in the CC field. This may be necessary to limit firmware overhead in modifying TTEs, such as illustrated in FIG. 5 for the case that modifying one TTE results in firmware scanning and incrementing predecessor and successor TTEs for a large number of IOPNs. The disclosure and claims herein expressly extend to any suitable value for the CC field, including values that are limited for performance reasons.

In some cases, the system software may naturally group successive DMA real pages in power of 2 sizes, such as 4 (16 KB total), 16 (64 KB total) or 256 (1 MB total) 4 KB pages. In an alternative embodiment, it may be desirable to take advantage of this organization of DMA pages to simplify hardware design by utilizing power of 2 values in the CC. The CC value may be defined to be then a power of 2 exponent towards this objective. For example, a CC value of '2' indicates that the number of RPNs within a range of successive RPNs is 4.

In another embodiment using power of 2 values, the CC value is an encoded value from within a range of encoded values. The encoded values in this embodiment reflect the typical power of 2 sizes such as previously described, that correspond to common power of 2 organizations of DMA pages utilizes by system software. For example, a CC value that is itself 4-bits can specify 16 encoded successive RPN values, such as a CC of 0 indicating no successors, 1 indicating 4 RPNs within a range of successive RPNs, 2 indicating 16 successive RPNs, and 3 indicating 256 successive RPNs. Other encodings within this exemplary encoded 4-bit CC field may be chosen according to the other common organizations of real pages within DMA pages managed by the system software.

In such embodiments utilizing power of 2 exponent or encoded power of 2 CC values, the CC values of all TTEs is the same, enabling the translation hardware to determine that an RPN is within a range of successive RPNs through simple bit masking of the IOPN at the CC power of 2 boundary.

As is required for any change to the contents of the translation table, firmware also signals the DMA translation hardware that TTEs have been changed to invalidate those affected. For example, in IBM POWER systems, firmware performs a store operation to a hardware address that communicates the address of either an individual TTE, a cache line of TTEs, or an entire translation table to indicate to that hardware to invalidate a set of cached DMA address translation entries in the specified IOPN range.

When the hardware receives a DMA request, that request can be translated by an existing TTE in the cache if the IOPN is within the range of an IOPN and CC of that existing TTE. For example, in FIG. 4, a TTE for IOPN1 in the cache, with RPN1 and CC value of 2, allows the hardware to determine the RPN for IOPN2. The hardware detects that IOPN2 is within the range of IOPN1+3 pages and can determine the RPN for IOPN2 as RPN1+1.

Utilizing ordinal CC values the hardware can determine that an IOPN is within a range of RPNs in the cache by comparing an IOPN2 with the value of a cached IOPN1 plus its CC number of pages. When the IOPN2 is determined to be within the range of pages of an IOPN1 in the cache, the hardware computes the RPN2 as RPN1 plus the IOPN2 minus IOPN1 number of pages.

Utilizing power of 2 CC values the hardware can determine that an IOPN2 is within a range of RPNs in the cache by setting to zero the low order bits corresponding to the power of 2 CC value of both an IOPN1 in the cache and IOPN2. If the resulting IOPNs match, then IOPN2 is within the range of RPNs corresponding to the TTE for IOPN1 in the cache. The hardware computes the RPN2 by first setting to 0 the low order bits of the RPN1, corresponding to the CC power of 2 value, and then performing a logical OR of that result with the same power of 2 low order bits from IOPN2.

When a DMA request is not within the range of IOPNs cached, as a result of fetching a new translation the hardware can optimize the content of the translation cache by comparing that IOPN and CC of a new TTE fetched from memory with that of TTEs already in the cache. If an existing TTE in the cache is within the RPN range (IOPN+CC) of the new TTE, but has a lower value CC than the new TTE, the hardware simply replaces the CC field of that existing TTE in the cache with the higher CC value of the new TTE from system memory. In comparison to the present art, this does not displace or cast out that prior TTE from the cache but instead increases the range of that translation in the cache, thereby increasing the effectiveness of the cache to translate subsequent DMA transfers at no loss of prior TTEs. If a TTE fetched from memory has no relationship to the RPN range of other entries in the cache, meaning it neither subsumes nor is subsumed by an entry already in the cache, the hardware must cast out an existing entry in the cache to then insert this entry in the cache. This is a common requirement in cache design and typical solutions are to cast out either the least frequently or least recently used entry.

With the cached TTEs disclosed herein, it is more optimal to cast out an entry having the smallest CC value, so as to maximize the likelihood that a future DMA request maps to an IOPN range already in the cache. Other heuristics could be used, such as combining frequency of use with CC values to avoid casting out a translation that is highly referenced, even though it may have a smaller CC value than other, less frequently referenced IOPNs.

In some embodiments the hardware may prefetch additional successive TTEs, either as part of fetching a translation not in the cache as well as when a DMA request references a translation in the cache, in anticipation that successive DMA requests will reference successive IOPNs. Utilizing a CC count, it is evident that the hardware may determine that a TTE in the cache subsumes successive IOPNs and that prefetch of successive TTEs is not necessary.

When a new translation is added to a translation table in system memory, multiple TTEs already in that table may be affected, particularly if the newly mapped IOPN has adjacent IOPNs that also have RPNs contiguous to that of the new TTE. Addition of a new TTE to the translation table in memory is described above. However, there are related actions firmware may take to inform the hardware and optimize the TTE cache in hardware.

The addition of a new TTE in a translation table may be such that it does not invalidate entries already in the hardware cache. Their IOPN range is still valid. However, if hardware is informed of a change in TTEs in that cache, or that a new TTE subsumes entries in the cache, then hardware can optimize the range of IOPNs in one or more TTEs, and possibly remove redundant entries that are now subsumed by inclusion of a new translation that increases the range of IOPNs defined by one TTE. In particular, if a new translation is between and thereby joins two ranges of successive IOPNs with successive RPNs into one larger range of IOPNs and RPNs, and the cache contains two TTEs, one for each range, the hardware can replace those two TTEs in the cache with the first TTE of new sequence of successive IOPNs. If firmware enters multiple new TTEs into the translation table, and these are between and join multiple smaller sequences of successive IOPNs and RPNs, then potentially there may be several TTEs in the cache that can be replaced by a single TTE at the start of the newly joined sequence.

Following an update to the translation table, adding one or a plurality of new TTEs, and updating the CC fields of the predecessor and successor TTEs that have contiguous RPNs, firmware signals the hardware to indicate what has changed. The firmware sends a command to the hardware, which may be a Memory-mapped Input/Output (MMIO) store to an address in the hardware that signifies a particular IOPN entry in the translation table in memory has been changed. This includes sending a changed TTE as an argument of the store, to communicate the IOPN, RPN, and CC values of that TTE.

As described above, entering a new TTE in a translation table with a CC field may result in incrementing the CC values of preceding TTEs for IOPNs that have successive RPNs. Deriving from the advantages of the CC field, the MMIO store communicates to the hardware that the TTE, from among those changed in the translation table, with the highest CC value. That TTE may be the new TTE itself, if there are no preceding IOPNs with RPNs contiguous to that of the new TTE, or it may be a TTE for an IOPN that has the RPN of the new TTE as a successor to other RPNs contiguous to the RPN of that preceding IOPN.

The hardware compares the TTE data signaled by the MMIO store to the existing TTEs. If the RPN range of any of the existing cache entries are subsumed by the RPN range of this modified TTE the hardware removes all the subsumed cached TTE entries and replaces one of those entries with the RPN, DMA IOPN and CC fields signaled with the MMIO TTE data. If there is no such matching TTEs in the cache, the hardware may either ignore the MMIO store and await a DMA request to that location, or as described above for newly fetched TTEs, the hardware may determine an entry in the cache to cast out, based on largest CC values (including the MMIO store TTE data) or CC value and more frequently accessed DMA IOPNs.

Firmware may also optimize this procedure and signal the hardware to perform a cache update only after adding or mapping a number of new TTEs, to increase the range of RPNs covered in the cache by that MMIO update signal, or to minimize the number of MMIO stores to the hardware, or both. In this way the hardware may optimize the cache relative to translation table changes, and without actually waiting for a subsequent DMA request to retrieve a TTE that would initiate optimizing the cache.

When changing a TTE to either remove or modify the RPN of an existing translation in the translation table, the CC values of other TTEs that included the changed TTE are changed, in addition to the RPN and CC of that TTE itself. If these TTEs are in the hardware cache then these cache entries must be invalidated. As an example, if a TTE with RPN1 and CC of 4 is in the hardware cache, and the TTE with RPN1 and CC of 2 is removed (invalidated in the translation table), then the TTE in the cache must be cast out of the cache (invalidated).

Following an update to the translation table that removes or changes an existing TTE, and updating the CC fields of the predecessor and successor TTEs that have contiguous RPNs, firmware signals the hardware to indicate what has changed. The firmware sends a command to the hardware, which may be an MMIO store to an address in the hardware that signifies a particular IOPN entry in the translation table in memory has been changed. This includes sending a changed TTE as an argument of the store, to communicate the IOPN, RPN, and CC values of that TTE or that that TTE is no longer valid in the translation table.

In the case that removing or changing a TTE breaks a sequence of IOPNs having successive RPNs, the firmware signals the hardware with the IOPN and new RPN and CC values, or valid state, of the changed TTE. The hardware than updates that TTE with these new values, if it is held within that cache, or may add the changed TTE to the cache if it includes a new RPN translation and meets the hardware criteria for adding new TTEs in general.

The hardware may instead have another TTE that includes the changed TTE. In this case the hardware must modify the cached TTE to account for the removal of that IOPN from the sequence of IOPNs having successive RPNs described by that cached TTE. This entails the hardware comparing the changed IOPN with the IOPN of the TTE in the cache, and then reducing the CC value of that TTE by number of IOPNs that include and followed that IOPN in the original sequence of successive IOPNs. The hardware may further create an additional, new TTE in the cache to represent the IOPNs following the changed IOPN, which are still successive RPNs within a smaller range, and then compute a CC value representing that smaller sequence for a TTE having the IOPN and RPN of the TTE immediately following the TTE signaled by the firmware as changed.

In an alternative method, when firmware signals a TTE as changed, the hardware may simply replace any TTE in the cache that included the changed TTE IOPN and RPN with that new TTE. If the TTE is changed to remove or invalidate a TTE, the hardware may instead cast out any TTE in the cache that included the changed TTE. The firmware then signals the hardware with the first TTE of each of the one or two new sequences of successive IOPNs and RPNs resulting from changing a TTE within that sequence.

If the changed TTE is either the first or the last IOPN of a sequence of successive RPNs, removing that TTE from the sequence results in a single sequence for which all TTEs have their CC values reduced by 1. Firmware then signals the hardware with the TTE corresponding to the first IOPN of that one resulting sequence. If, instead, the changed TTE is an IOPN in the middle of a sequence of successive RPNs, removing that TTE from the sequence results in two individual sequences, one that ends with the RPN preceding the original RPN of the changed TTE, and one that starts with the next successive RPN to the original RPN in the changed TTE. Firmware then signals the hardware with the TTE corresponding to the first IOPN of each of these two resulting sequences.

Over time, it is clear that for translation tables that do not change frequently and have large CC values (more contiguous real pages), the cache becomes highly optimized with relatively few entries required to avoid translation table fetches for most DMA requests. For logically partitioned computer systems that manage systems with LMBs composed of successive (contiguous) real pages, such as the POWER systems using LMBs of 256 MB, relatively few TTEs within the cache can span a very large range of DMA IOPNs. A typical size cache of 64 entries could, for example, hold translations for 16 GB of DMA addresses.

In an embodiment in which the CC value is a power of 2, a change to one TTE within the power of 2 range of IOPNs and RPNs that removes that TTE from the successive RPNs results in a sequence of RPNs that is no longer a single power of 2 and a reduced count. Instead, a next lower power of 2 range of successive RPNs results in one half of the original power of 2 range, and potentially several power of 2 ranges in the half of the original range that contains the changed TTE.

Similarly, in an embodiment in which the CC value is a power of 2, a change to one or more TTEs may result in a larger power of 2 range of successive RPNs for which the firmware may increase a power of 2 CC to a higher power of 2.

In these cases firmware must update multiple TTEs with new power of 2 CC values. The use of power of 2 CC values includes the firmware signaling the hardware to temporarily suspend caching new translations and to invalidate the existing power of 2 translation that may be in the cache. The firmware then updates the affected TTEs to determine new power of 2 CC values for the largest power of 2 ranges of successive RPNs that results. Following updating all TTEs, the firmware then signals the hardware to resume caching translation entries, including also signaling the hardware with the first TTE(s) in the new power of 2 ranges, such that the hardware may then determine to enter these into the cache.

Figure 11:
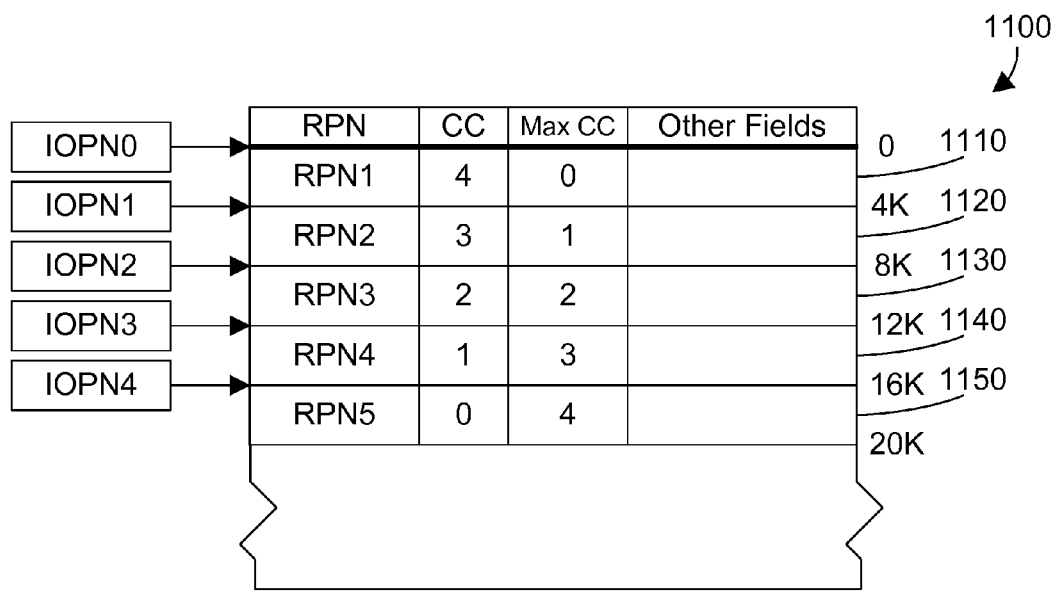
FIG. 11 shows a DMA address translation table that includes a CC field and a max CC field.

However, for TTEs using ordinal CC values further optimizations are possible if the hardware computes the starting DMA translation and highest RPN value in any set of contiguous RPNs. This is possible by including a "Max CC" value in addition to the CC value, as shown in FIG. 11. The Max CC indicates the number of successive IOPNs preceding the TTE fetched for a first DMA within a sequence of IOPNs having successive RPNs. Referring to FIG. 11, each TTE includes a Max CC field indicating how many successive RPNs precede each TTE in the table. Upon fetching any one translation in sequence of IOPNs 0 through 4, the hardware can determine the TTE of the first IOPN in that sequence and generate that TTE in the cache. The Max CC field is thus helpful in generating entries in the DMA address translation cache 184 (FIG. 1) that will improve DMA performance. A simple example will illustrate.

In FIG. 11, when the DMA address mechanism 182 retrieves entry 1140, corresponding to IOPN3 in the IO bus address space, and determines that RPN4 is the memory address of the DMA request, but that having a Max CC value of 3 and a CC value of 1, the hardware can compute that IOPN0 would have a starting RPN of RPN4 minus 3 (RPN1), a CC value of 4 (Max CC of 3 plus CC of 1), and a Max CC value of 0 (as the first IOPN in the sequence). The hardware may then generate the IOPN0 TTE 1110 in the cache without having to fetch that TTE. Generating TTEs in the cache within fetching the TTEs improves performance of the DMA address translation cache 184.

Figure 12:
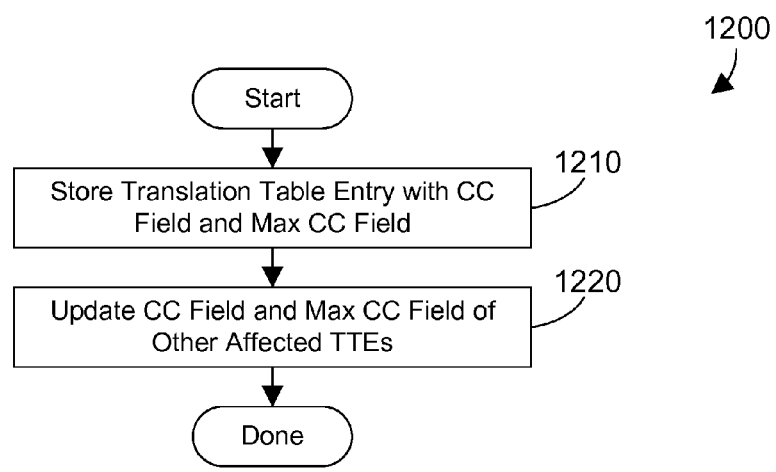
FIG. 12 is a flow diagram of a method for using the CC and Max CC fields shown in FIG. 11.

Referring to FIG. 12, a method 1200 shows use of the CC field and the Max CC field shown in FIG. 11. A TTE is stored with its corresponding CC field and Max CC field (step 1210). The CC field and Max CC field of other affected TTEs are also updated (step 1220). A TTE is affected in this context when the addition of the TTE in step 1210 causes a need to update its CC and/or Max CC field.

Figure 13:
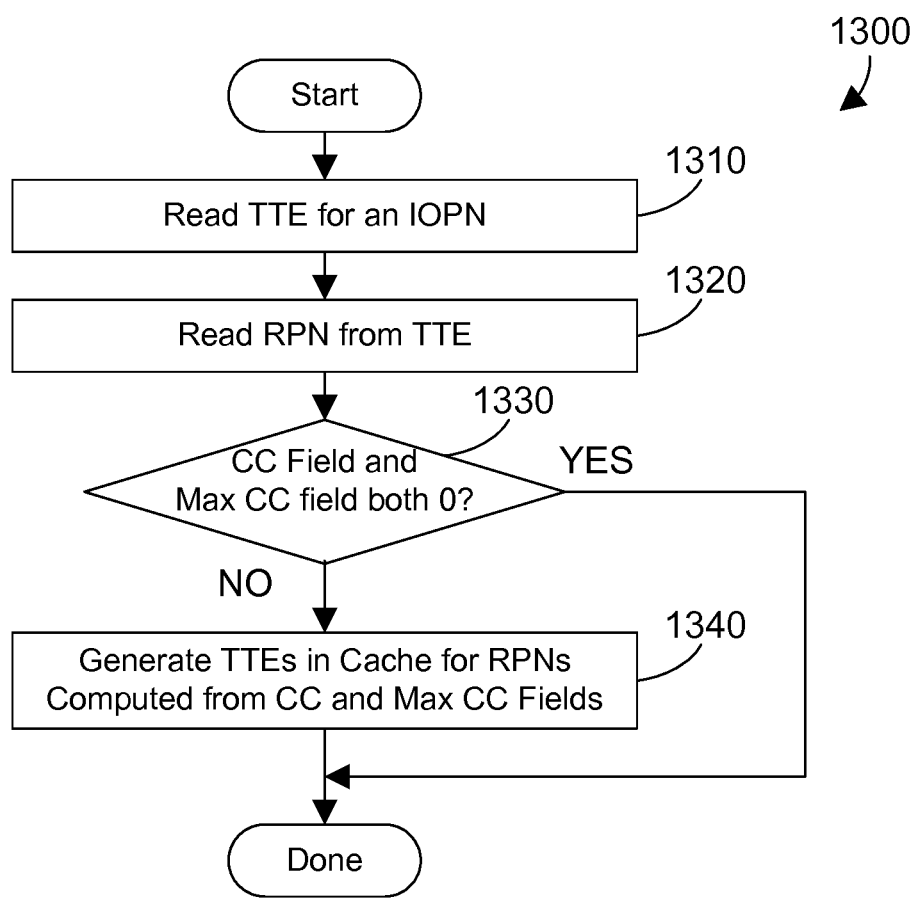
FIG. 13 is a flow diagram of a method for generating entries in a DMA address translation cache using the CC field and the Max CC fields shown in FIG. 11.

FIG. 13 shows a method 1300 for using both the CC field and the Max CC field to automatically generate TTEs in a DMA address translation cache. A TTE for an IOPN is read (step 1310). The RPN is read from the TTE (step 1320). When both the CC field and the Max CC field of the TTE are both zero (step 1330=YES), method 1300 is done. When either the CC field or the Max CC field or both are non-zero (step 1330=NO), TTEs may be generated in the cache for RPNs computed from the CC and Max CC fields (step 1340), as described in more detail below.

Combining the RPN and CC with the Max CC in the TTE and cache, a computing system utilizing IO bus DMA addresses mapped to LMBs composed of successive real pages of memory, or any large sequence of successive RPNs, can determine the TTE of the first IOPN of that LMB or sequence upon the first DMA request to any IOPN within that LMB or sequence. This then enables the hardware to translate any subsequent DMA request involving any other IOPN within the range of that LMB, without retrieving any other TTEs from memory. This provides an enormous performance advantage over the state of the art that provides very simple, on-demand caching of most recently referenced TTEs, within caches limited to a very small number of TTEs by hardware requirements.

Both POWER IO architecture for PCI and Intel VT-d include indirect translation entries in translation tables. This allows a large DMA (IOPN) address space to be translated to RPNs using multiple, discontiguous smaller translation tables. A disadvantage of this method using indirect translations is that the DMA hardware must make multiple fetches to translate an IOPN to a RPN, potentially up to 3 or more according to the limits of the translation table architecture (3 for VT-d, 5 for POWER).

In Intel based systems, in particular, hypervisors such as VMWare and KVM are fundamentally operating system kernels that allocate memory for translation tables from the operating system page pool. Commonly, these pages are allocated from that pool as non-contiguous and require VT-d multi-level translation tables. As even a single translation fetch introduces added latency, multiple fetches from linked indirect translation tables multiplies this latency and can significantly degrade IO performance.

The disclosure and claims herein include a method to improve the ability for DMA hardware to cache translations for indirect TTEs as well as "final" translations to RPNs, in combination with a CC value, to reduce the number of fetches of indirect translations as well as RPNs, with efficient use of the cache itself. This can greatly improve DMA performance in such systems, particularly as indirect translation table linkages (indirect translation entries) rarely if ever change once the OS has constructed these tables. For system using multi-level translation such as Intel with VMWare and KVM, this can eliminate many indirect translation fetches to produce dramatic DMA performance gains.

Figure 14:
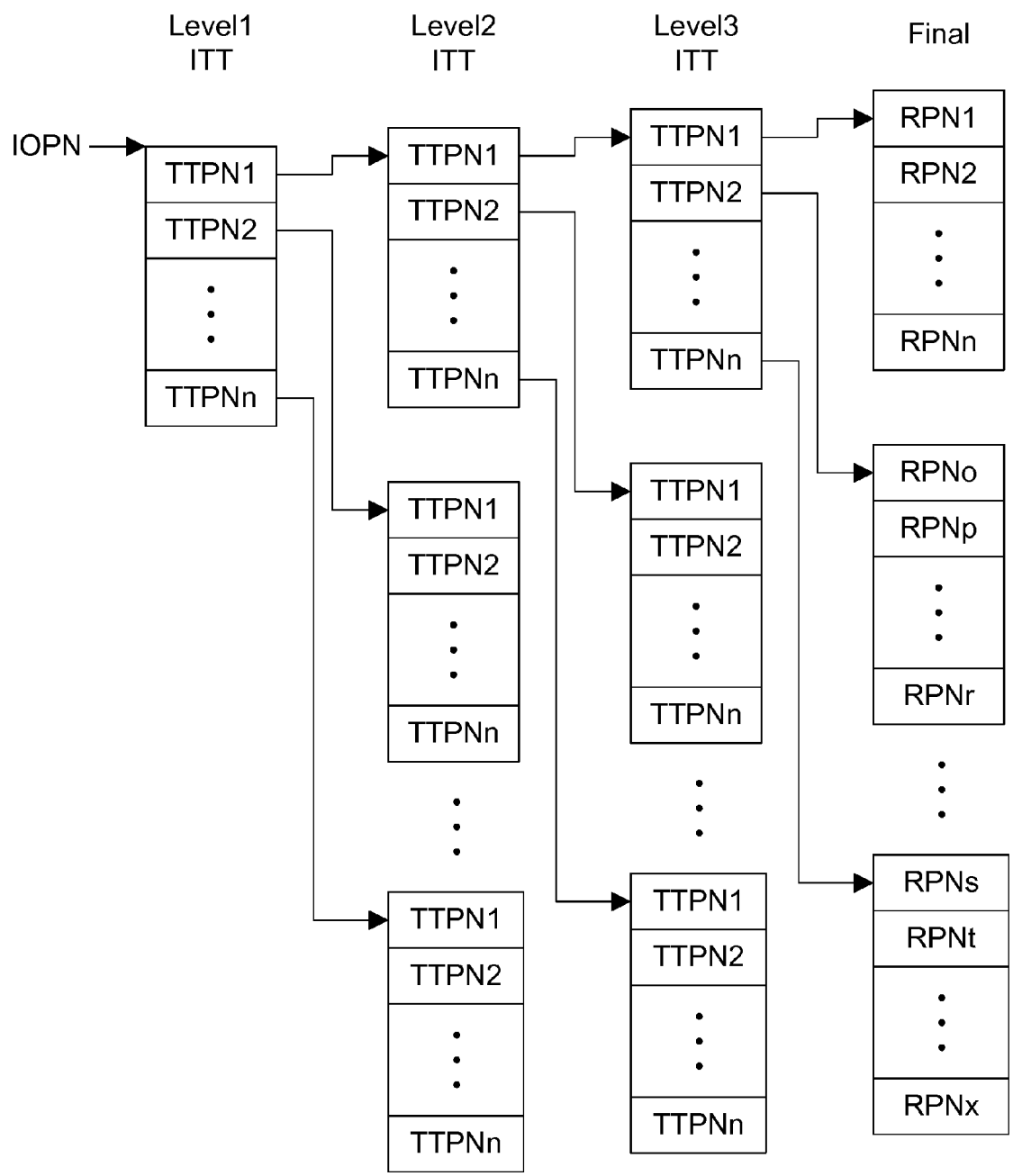
FIG. 14 is a block diagram showing multiple levels of indirect translation tables (ITTs)

FIG. 14 shows an example multi-level translation table structure such as would be used with Intel VT-d and POWER indirect TTEs. In a multi-level translation scheme, multiple translation tables are combined in a tree-structure to translate an IOPN to an RPN. The first n−1 tables in an n-level structure are intermediate translation tables in which the TTE contains the address of the next level table. The last, or nth, table then contains the final RPN translation for that original IOPN. The benefit of such a table is that no single table need span a large range of contiguous memory, and the firmware or operating system can construct the translation table from small regions of contiguous memory, possibly as small as one 4 KB page per table. The disadvantage, of course, to this method is that hardware may have to make many fetches to memory to obtain a translation to an RPN, which can greatly reduce overall IO performance or add to the expense and complexity of hardware to mitigate or overcome these performance reductions.

For a multi-level table, a TTE within an intermediate translation table (ITT) contains a Translation Table Page Number (TTPN) that is the address in system memory of another translation table. That translation table may in turn have TTEs that are RPNs of a DMA address target in memory or may be TTPNs that link to yet another level of translation table. As shown in FIG. 14, a set of high order bits of the IOPN of a DMA address indexes a TTPN in a first level (Level1) Indirect Translation Table (ITT). The first level ITT must be contiguous memory to allow a subset of DMA address bits of an IOPN to index that table directly. Commonly the DMA address hardware has a register that software programs with the base address and the number of levels of the multi-level structure so that the firmware knows how to index the table(s) using bits of the IOPN within a DMA address.

The TTPN in the first table links to a second level ITT, and additional bits of the IOPN index this table to select a TTE. The second level (Level2) ITT contains TTPNs to yet a third level (Level3) ITT. Yet more bits of the IOPN DMA address index this level 3 ITT to select a TTE that now points to a final translation table that contains the actual RPN corresponding to the IOPN DMA address. A final set of the IOPN DMA address bits select an entry in this translation table, which then provides the actual RPN of the IOPN page.

Using conventional methods, DMA hardware must translate each IOPN with multiple ITT fetches. In the example in FIG. 14, this requires four successive fetches for each IOPN involved in a DMA. Using TTEs with a CC value of the final translation table provides the same advantages in TTE caching as single level tables, as the RPNs in any final table represent a set of successive IOPNs, whether or not the RPNs in that table are themselves successive.

However, it is possible that in many cases the memory pages composing the ITTs are themselves contiguous memory pages. Particularly, if the firmware constructs the multi-level ITTs early enough in OS boot or runtime, prior to the memory pool becoming fragmented, it is likely that many pages of the 2nd and higher level ITTs are contiguous. The combination of a CC value with the TTPNs in the TTEs of an indirect level enables the firmware to determine a TTPN for a new IOPN from a TTE in the translation cache for any IOPN that is translated through an ITT at some level in the multi-level table structure that is contiguous in memory to another ITT at that same level in the table structure.

Specifically, a TTE in an ITT includes a CC field that indicates that successor ITTs are in pages contiguous to that first TTE. Each successor TTE has a CC that is one lower than its predecessor, just as for RPNs that are consecutive to a first IOPN to RPN translation. When DMA address mechanism 182 receives a request for a new IOPN, the DMA address mechanism 182 interrogates its cache to determine if there are any translations in the cache that contain that IOPN and CC value that spans an IOPN range that includes the new IOPN. If so, the DMA address mechanism 182 then uses that translation and does not need to fetch a TTE from memory to perform translation at that level.

Caching ITT translations in the cache, as well as RPN translations, means that a cache may contain multiple translations for an IOPN, or an IOPN within a range of IOPNs spanned by a TTE in the cache. In the minimum, a cache may contain a TTE for a TTPN in some level of the ITT tables, as well as a TTE that is or implies the actual RPN of an IOPN. To enable the DMA address mechanism 182 to distinguish, the cache entry for a TTE includes an ITT level value that indicates that the TTE is from an ITT or is the final translation of an IOPN to an RPN. When '0', this value indicates a final translation to an RPN. When >0, this value indicates at which level in the translation structure the ITT referenced is located, '1' for 1st level, '2' for second level, and so forth. The DMA address mechanism 182 stores this value in the cached TTE based on the level of ITT from which that TTE was retrieved.

It is possible that a translation table cache may include a TTE for every level of the multi-level translation table that includes that IOPN. Therefore, when the DMA address mechanism 182 must translate new IOPN, and it encounters multiple entries in the cache that contain that IOPN, the hardware must apply a precedence order to translating that IOPN. If the cache contains a TTE that is or implies a final translation from that IOPN to an RPN, use that translation.

If the cache contains one or more TTEs that are or imply a translation from that IOPN to an ITT TTE, the hardware compares the ITT level values of those TTEs in the cache and uses the entry that has the highest value as the address from which to then fetch the next level translation. This translation must be retrieved from the memory translation tables because there is no RPN translation known in the cache, and this is the translation table that is closest to the final translation table containing that RPN in the overall multi-level translation table structure.

Using the example of the four level translation table shown in FIG. 14, the hardware interrogates its translation cache for an incoming DMA to determine if the cache contains a TTE for either an intermediate or final table in that overall translation. Note that the hardware may cache TTEs for one or multiple intermediate tables (TTPNs) as well as the final TTE containing the RPN, for any one IOPN. That is, an IOPN1 may hit upon as many as four TTEs in the cache, one for each ITT and one for the final translation table in the structure. The hardware must then determine which TTE to use, if in the cache.

When a DMA request is received, the DMA address mechanism 182 inspects the cache to determine if it contains an intermediate or final translation for the IOPN of that request. The hardware decomposes the IOPN of a DMA address in the cache into the bit fields within the IOPN that select entries in the intermediate and final TTs and then compares these to TTEs in the cache. If all bits of DMA IOPN match the content of a cached TTE, this TTE contains the RPN to use for DMA. If not all bits match, hardware compares the bits of the IOPN corresponding to levels 1 and 2 to TTEs in the cache. If these match some TTE, that TTE contains a TTPN that is then used as the address of the final of translation table. If not all bits for levels 1 and 2 match, hardware compares the bits of the IOPN corresponding to level 1 to TTEs in the cache. If these match, the cached TTE contains a TTPN that is then used as the address of the final of translation table. If no bits of the IOPN match a TTE in the cache, hardware must fetch the first level TTE and then fetch the TTEs in the translation table tree until it retrieves the RPN for that IOPN.

Note some of the steps above can be performed in parallel, and more than one may hit on a TTE, if TTEs for multiple levels of the table for that IOPN are in the cache. When there are multiple matches, the hardware uses the TTE that represents the furthest table from the root, i.e., the highest numbered table.

When fetching new translations from memory, the DMA address mechanism 182 may cache those TTEs to ITTs, much as for single-level translations directly to RPNs. This may require casting out another TTE to allow space for this TTE. To determine which cached TTE to cast out, the DMA address mechanism 182 applies basically the same precedence as for selecting a translation to use for a new IOPN DMA. If the cache contains no TTEs that include this IOPN, choose a TTE with the lowest ITT level, as this TTE requires the most fetches from memory to complete an IOPN to RPN translation. If the cache contains no TTEs that include this IOPN but there are several TTEs with the same ITT level value in the cache, the hardware may cast out the least frequently used, or may cast out that entry with the smallest CC value, indicating the fewest IOPNs spanned by that TTE. If the cache contains one or more TTEs that include this IOPN, the hardware compares the ITT level values of those TTEs in the cache and uses the entry that has the lowest value as the address to cast out, as translations closest to the final RPN translation are more desirable to retain as they require fewer memory fetches to complete a translation to an RPN. If the cache contains only TTEs with RPNs (all ITT level 0) the DMA address mechanism 182 chooses a TTE to cast out using the same criteria as single-level TTEs in the cache.

Figure 15:
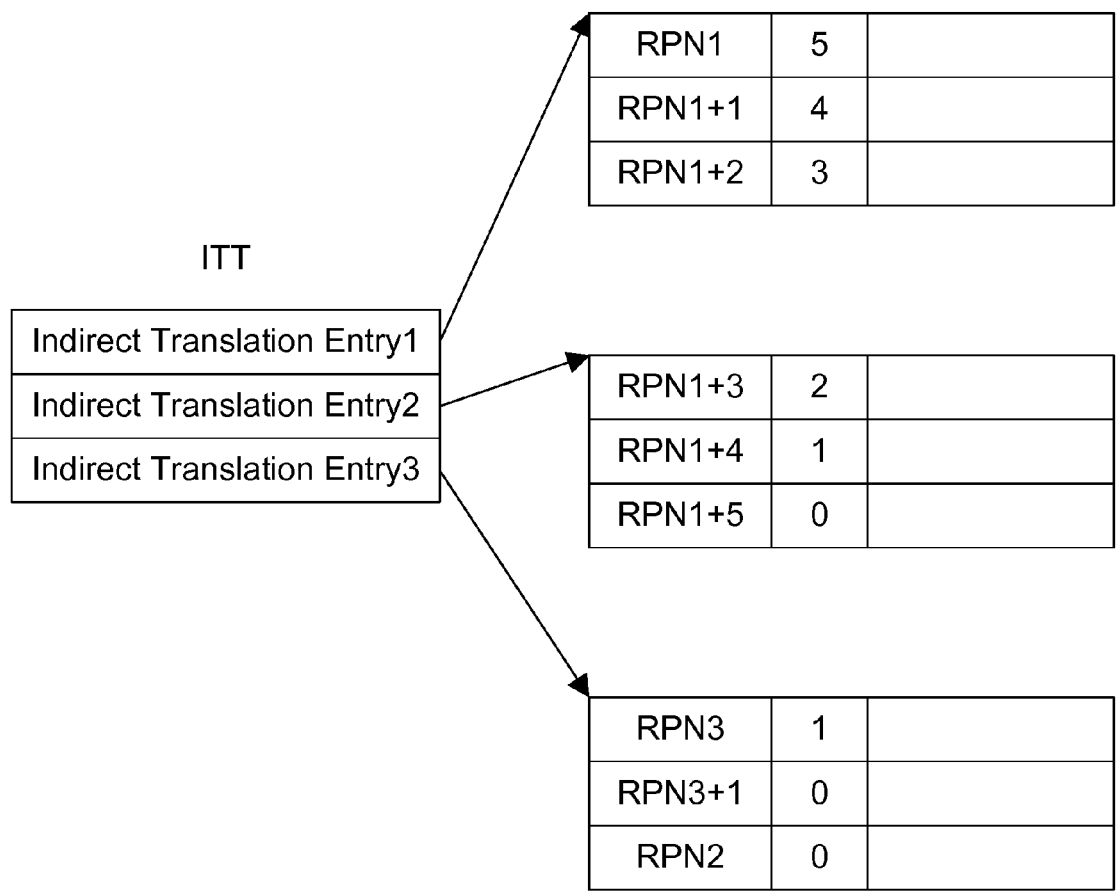
FIG. 15 is a block diagram showing how indirect translation table entries can map to sequential RPNs.

The CC field in the final translation table can span across the translation table itself, as illustrated in FIG. 15. The first indirect translation entry of ITT points to a final level translation table, whose first entry is RPN1 with CC field of 5. But the final translation table itself contains only 3 entries. In this case, the CC field of 5 in this translation entry is applicable to the TTEs pointed by the second indirect translation entry, and implies that the RPN's for the translation entries starting from RPN1 to RPN1+5 are all contiguous. The CC field as applied to final translation tables in successive memory pages is advantageous in that the hardware then need not fetch or cache more than one TTE within a sequence of TTEs having successive ITPNs, and that the hardware also need not fetch or cache TTEs from more than one final translation table in a sequence of TTEs with successive ITPNs.

It would be obvious to one skilled in that art that the preceding mechanisms apply equally and with minor modifications to CC values that are ordinal versus those that are defined to be power of 2 to obtain hardware simplifications.

The application of a CC and Max CC to TTEs containing RPNs applies also to TTEs containing ITPNs, where the ITPNs for a sequence of successive TTEs within an ITT are also successive. In this regard, all the advantages of the present invention that apply to TTEs with RPNs of single-level translation tables are extended to TTEs within both ITTs and final translation tables in a multi-level translation structure, as shown in FIGS. 14 and 15. Similarly, the advantages of the Max CC within TTEs also extend to ITTs and final translation tables of a multi-level translation structure It is noted that in some architectures, including POWER TCE and Intel VT-d, that TTEs may include flags indicating whether an RPN is available for only DMA read, DMA write, or both read and write. It would be obvious to limit the sequences of IOPNs having successive RPNs to only successive IOPNs that also have the same DMA access authority (read, write, or both) for those successive RPNs. Thus, it is not necessary to include additional indications in any one TTE as to whether its predecessor or successor TTEs are authorized for read, write, or both, beyond those authorities as they are normally indicated in any one TTE (e.g., as a read and a write permission flag set by firmware).

This may appear superficially to reduce the value of the CC and Max CC values towards optimizing cached TTEs to reduce translation fetches. However, in practice it is rare that successive pages within a range of contiguous real memory enabled for DMA are of variable permissions. More typically, one DMA buffer in memory may contain control information that is read only for DMA, and one or other buffers that are enabled for DMA write, or both read and write, to transfer the data that is the object of the control information. Therefore it is typical that sequences of IOPNs with successive RPNs all have the same DMA permissions, so the advantages of using TTEs with CC and Max CC fields are realized.

The claims and disclosure herein provide DMA translation table entries that include a consecutive count (CC) field that indicates how many subsequent translation table entries point to successive real page numbers. A DMA address translation mechanism stores a value in the CC field when a translation table entry is stored, and updates the CC field in other affected translation table entries as well. When a translation table entry is read, and the CC field is non-zero, the DMA controller can use multiple RPNs from the access to the single translation table entry. Thus, if a translation table entry has a value of 2 in the CC field, the DMA address translation mechanism knows it can access the real page number (RPN) corresponding to the translation table entry, and also knows it can access the two subsequent RPNs without the need of reading the next two subsequent translation table entries. This reduces the number of accesses for translation table entries, which improves system performance.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer system comprising:
   at least one processor;
   a memory coupled to the at least one processor, the memory having a plurality of real pages that have a corresponding plurality of real page numbers;
   a direct memory access (DMA) address translation table in the memory that includes a plurality of entries, each entry comprising:
   a pointer to one of the plurality of real page numbers; and
   a consecutive count field that defines a number of subsequent translation table entries that point to real page numbers sequential and subsequent to the one real page number; and
   a DMA address translation mechanism that adds an entry to the DMA address translation table and writes a value of zero to the consecutive count field for the entry when a subsequent entry immediately following the entry does not point to a next sequential real page number, and writes a value greater than zero to the consecutive count field for the entry when the subsequent entry points to the next sequential real page number.

2. The computer system of claim 1 wherein the DMA address translation mechanism updates the consecutive count field of any other entries affected by adding the entry to the DMA address translation table.

3. The computer system of claim 2 wherein one of the other entries is affected by adding the entry to the DMA translation table when the entry points to a real page number that is adjacent the real page number of the affected entry.

4. The computer system of claim 1 wherein the DMA address translation mechanism reads a selected entry in the DMA translation table, and when the selected entry has a non-zero value in the consecutive count field, and when a DMA transfer spans a plurality of subsequent successive translation table entries that includes the selected entry, the DMA address translation mechanism returns the real page number for the selected entry and returns at least one subsequent real page number based on the consecutive field count without accessing any corresponding entry in the DMA address translation table.

5. The computer system of claim 1 wherein each entry further comprises a maximum consecutive count field that defines a number of preceding entries that point to real page numbers sequential to and preceding the one real page number.

6. The computer system of claim 1 wherein the DMA address translation table comprises at least one indirect translation table and a final translation table that includes the pointer to the one real page number.

7. The computer system of claim 1 further comprising a DMA address translation cache that stores a plurality of the DMA address translation entries.

8. A computer system comprising:
   at least one processor;
   a memory coupled to the at least one processor, the memory having a plurality of real pages that have a corresponding plurality of real page numbers;
   a direct memory access (DMA) address translation table in the memory that includes a plurality of entries, each entry comprising: a pointer to one of the plurality of real page numbers;
   a consecutive count field that defines a number of subsequent entries that point to real page numbers sequential and subsequent to the one real page number; and
   a maximum consecutive count field that defines a number of preceding entries that point to real page numbers sequential to and preceding the one real page number;
   a DMA address translation mechanism that adds an entry to the DMA address translation table and writes a value of zero to the consecutive count field for the entry when a subsequent entry immediately following the entry does not point to a next sequential real page number, and writes a value greater than zero to the consecutive count field for the entry when the subsequent entry points to the next sequential real page number, the DMA address translation mechanism updating the consecutive count field of any other entries affected by adding the entry to the DMA address translation table, wherein one of the other entries is affected by adding the entry to the DMA translation table when the entry points to a real page number that is adjacent the real page number of the affected entry, wherein the DMA address translation mechanism reads a selected entry in the DMA translation table, and when the selected entry has a non-zero value in the consecutive count field, and when a DMA transfer spans a plurality of subsequent successive entries that includes the selected entry, the DMA address translation mechanism returns the real page number for the selected entry and returns at least one subsequent real page number based on the consecutive field count without accessing any corresponding entry in the DMA address translation table.

9. The computer system of claim 8 wherein the DMA address translation table comprises at least one indirect translation table and a final translation table that includes the pointer to the one real page number.

\* \* \* \* \*